(No Model.)
C. L. WILSON, J. W. UNGER, C. MUMA, A. P. BROSIUS & J. C. KUCHEL.
ACETYLENE GAS GENERATOR.
No. 598,213. Patented Feb. 1, 1898.
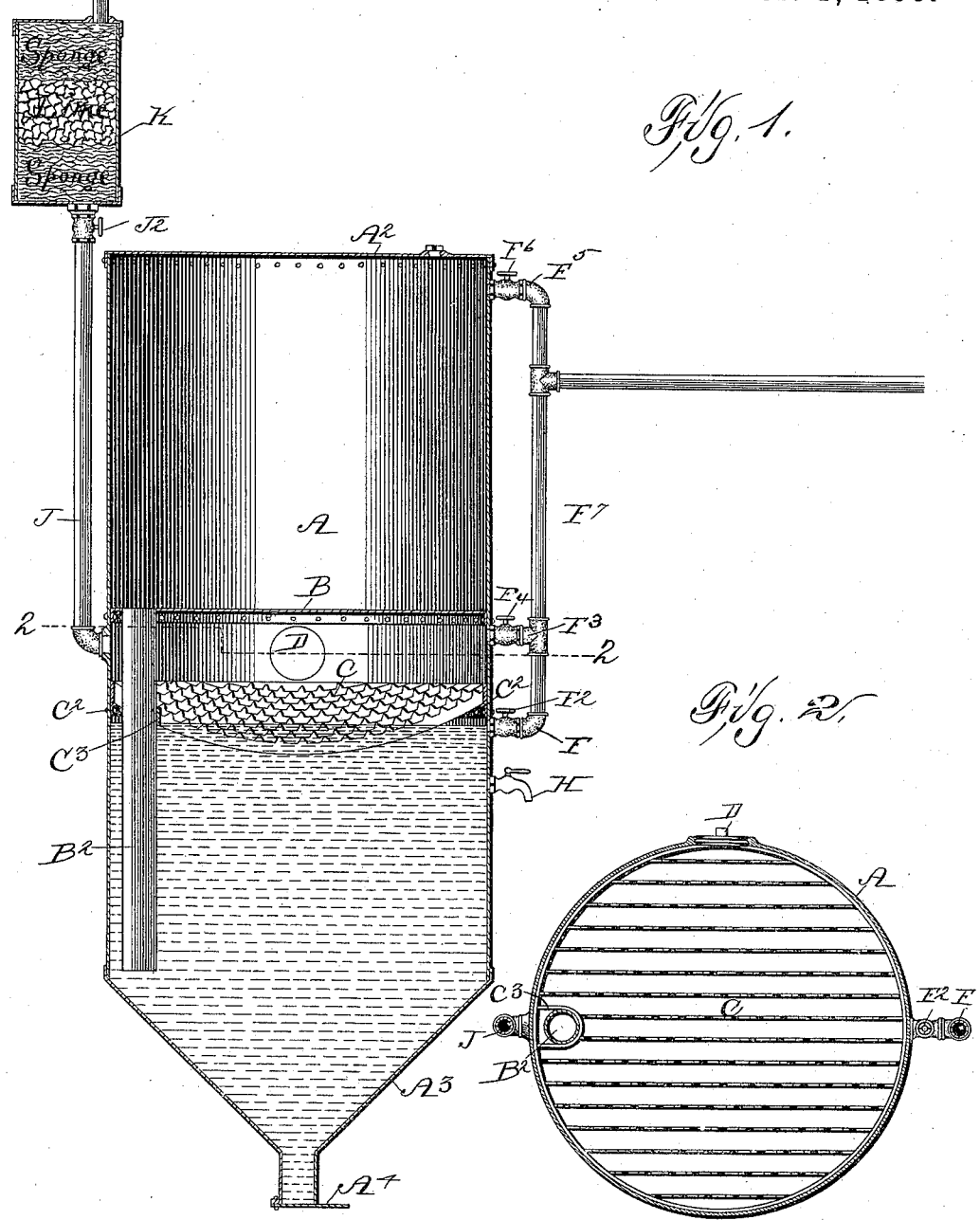

UNITED STATES PATENT OFFICE.

CORYDON L. WILSON, JOHN W. UNGER, CHARLES MUMA, AMOS P. BROSIUS, AND JOSEPH C. KUCHEL, OF HOLSTEIN, IOWA.

ACETYLENE-GAS GENERATOR.

SPECIFICATION forming part of Letters Patent No. 598,213, dated February 1, 1898.

Application filed November 13, 1896. Serial No. 611,986. (No model.)

*To all whom it may concern:*

Be it known that we, CORYDON L. WILSON, JOHN W. UNGER, CHARLES MUMA, AMOS P. BROSIUS, and JOSEPH C. KUCHEL, citizens of the United States, residing at Holstein, in the county of Ida and State of Iowa, have invented a new and useful Gas-Generator, of which the following is a specification.

The object of this invention is to provide an acetylene-gas generator of simple, cheap, and durable construction in which the generation of gas is automatically stopped when the pressure exceeds a certain predetermined degree and again started after the gas-pressure is reduced by the discharge of gas, and, further, to accomplish this desideratum without the employment of a movable or sliding gasometer.

A further object is to provide a generator of such construction that the generating-chamber is covered by water during active use.

A further object is to provide a grate for containing calcium carbid and for permitting the parts thereof that have been subjected to moisture to fall through the grate and thus be placed out of contact with the unaffected calcium carbid.

A further object is to provide means whereby the air in the chamber may be drawn off as soon as the generation of gas commences, so that air will not pass through the burners before the gas, and also to provide means whereby the air, surplus gas, and bad odors arising from the generator may be conducted away from the machine; and a further object is to provide an improved device of simple and durable construction for filtering the gas before it passes to the burners.

Our invention consists in certain details of construction, arrangement, and combination of the various parts of the device, as hereinafter set forth, pointed out in our claims, and illustrated in the accompanying drawings, in which—

Figure 1 shows a vertical sectional view of the complete apparatus. Fig. 2 shows a horizontal sectional view on line 2 2 of Fig. 1.

Referring to the accompanying drawings, the reference-letter A is used to indicate a sheet-metal cylinder having a flat top $A^2$ and an inclined bottom $A^3$, provided with a gate $A^4$, by which its contents may be drawn off.

At the approximate central portion of the cylinder A is a horizontal partition B, and a pipe $B^2$ is extended from the partition to a point near the bottom of the lower compartment.

The calcium carbid is supported in the apparatus upon a bowl-shaped grate in the upper portion of the lower chamber. The grate is composed of a number of thin metal bars C, having saw-toothed upper edges. The ends of the bars are placed on a bracket $C^2$, that is secured to the inner surface of the chamber. At the point where the pipe $B^2$ passes through the grate we have provided a curved portion $C^3$ in the rim, to which the bars are fixed. This construction of the grate will permit the residue of the calcium carbid, as soon as the latter is decomposed by contact with water, to pass through the grate and hence not convey the moisture to the unaffected carbid.

D indicates a screw-cap to cover an opening in the side of the cylinder directly below the partition therein. This opening provides for the introduction of calcium carbid upon the grate.

F indicates a pipe leading from the chamber below the grate and having a valve $F^2$ therein. $F^3$ indicates a like pipe leading from the chamber directly above the grate, also provided with a valve $F^4$, and $F^5$ indicates an outlet-pipe at the top of the upper cylinder provided with a valve $F^6$. All of these pipes communicate with a pipe $F^7$, which conducts air, gases, &c., to the outside atmosphere.

H indicates a water-cock in the lower chamber below the grate.

J indicates the gas-supply pipe, having a valve $J^2$ therein and leading from the top of the lower chamber into a filtering apparatus which is constructed as follows:

K indicates a receptacle connected with the pipe J and filled with first a layer of sponge or other porous substance, next a layer of some substance capable of taking all moisture from the gas—such, for instance, as charcoal, lime, hydrated clay, &c.—and finally a top layer of sponge or other porous material to hold the lime, charcoal, &c., in place and aid in purifying the gas.

In practical operation a quantity of calcium carbid is placed on the grate through the opening in the side of the chamber. Then the lower portion of the apparatus is filled with water through the screw-cap at the top of the cylinder until the water reaches and partially submerges the grate. As soon as water reaches the grate the calcium carbid is affected and the generation of gas is commenced. The gas immediately rises to the top of the chamber and when the pressure is great enough the water is forced down in the tank and into the upper compartment thereof through the pipe $B^2$. The layer of air that will lie between the water and gas may be drawn off through the pipe F, which is closed again as soon as the gas fills the space between the water and the partition in the cylinder. The pipe leading to the filtering-tank is then opened and the gas allowed to pass therethrough. When the gas is being generated faster than used, the pressure on the water will force same into the upper chamber through the pipe $B^2$. This will keep the generating-chamber cool and hold the gas under pressure, and as fast as the gas is withdrawn the water returns to the lower chamber, thus maintaining the pressure on the gas; then when the supply of gas is almost exhausted the water will again reach the calcium carbid on the grate and the generation of gas be again started, with the same result as before.

It has been found that the gas generated from calcium carbid contains particles of dust from the carbid, and it is obvious that the filter through which the gas is passed will thoroughly remove all the dust and also all moisture from the gas. Should it be desirable to renew the supply of carbid on the grate, a part of the water may be drawn off through the cock H in the lower chamber and the gas in the top of the lower chamber permitted to escape through the pipe $F^3$. After the carbid is in place enough water is added through the upper chamber to reach the carbid, when the generation of gas will begin, as before. The refuse from the carbid collects in the bottom of the lower chamber and may be drawn off through the gate in said bottom at any time.

Having thus described our invention, what we claim as new therein, and desire to secure by Letters Patent of the United States therefor, is—

1. An acetylene-gas generator, comprising in combination, a generating-chamber, means for providing access to the interior thereof, a grate therein, means for supplying water to the grate, an air-discharge pipe leading from a point at the top of said chamber, a second discharge-pipe leading from a point adjacent to the water-level of the generating-chamber, and a gas-service pipe leading from the generating-chamber at a point in a horizontal plane between the aforesaid pipes, for the purposes stated.

2. In an acetylene-gas generator, the combination with a water-tight tank, a grate near its upper end, a second water-tight chamber above the first, a pipe leading from the lower end portion of the lower tank to the upper tank, and means for providing access to the said grate of a gas-supply pipe leading from a point near the upper end of the lower chamber, and three pipes for carrying off air, &c., leading from the following points, to a suitable point of discharge; below the grate; immediately below the top of the generating-chamber, above the aforesaid gas-supply pipe; and from a point near the top of the upper tank, and cut-off valves in each of said pipes, substantially as and for the purposes stated.

CORYDON L. WILSON.
JOHN W. UNGER.
CHARLES MUMA.
AMOS P. BROSIUS.
JOSEPH C. KUCHEL.

Witnesses:
E. N. JOHNSON,
O. H. KIMS.